April 7, 1953 H. N. KALB 2,634,334
CARRIER CURRENT COMMUNICATION SYSTEM
Filed Feb. 20, 1948
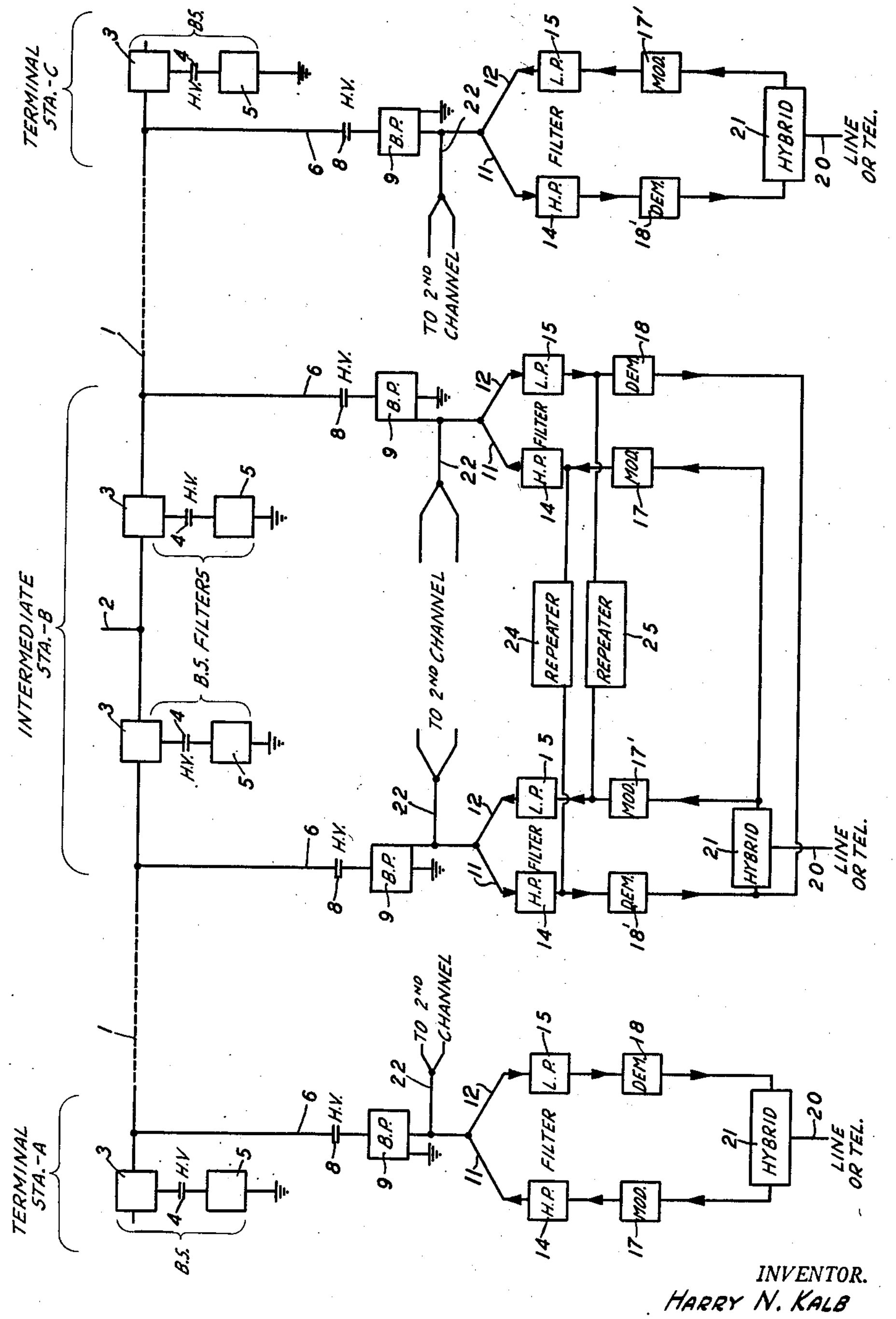
INVENTOR.
HARRY N. KALB
BY Donald K. Lippincott
ATTORNEY Patented Apr. 7, 1953 2,634,334

UNITED STATES PATENT OFFICE 2,634,334

CARRIER CURRENT COMMUNICATION SYSTEM

Harry N. Kalb, San Francisco, Calif.

Application February 20, 1948, Serial No. 9,779

3 Claims. (Cl. 179—2.5)

This invention relates to carrier current communication systems, and particularly to such systems as apply to power lines, or other services involving transmission over lines where there are marked impedance irregularities.

Communication systems of the type mentioned have found one of their greatest fields of use in inter-station communication on high tension transmission and distribution systems. The special conditions met with in this service have introduced problems which are quite different from those ordinarily met in telephone-line communication. Among these problems are those resulting from the fact that the lines carry voltages of a very dangerous character, and also that the lines are subject to wide variations in terminal impedance of various sections, due to switching operations at junction or terminal points, branch line connections, etc.

Early systems of this character transmitted by means of what was essentially a radio broadcast transmitter, which was coupled to the power lines by means of an antenna strung below or between the lines. A similar antenna was used at the receiving end, this antenna possibly serving also as a transmitter when messages were sent in the opposite direction. Later the development of high tension coupling condensers led to the abandonment of the antenna and the use, instead, of a high tension condenser of this type in series with a tuned inductance to impress the signal on or remove it from the line, all substantially in accordance with the then broadcast practice. A still later development was the insertion at the end of a section of the line, at some point of impedance irregularity, of line wave traps, which tended to prevent the transmission of the carrier power beyond the terminus of the section, and to prevent major variation of transmission constants when switching occurred.

Current practice has led to the use of single side-band transmission for such systems, instead of the former "broadcast" technique, but otherwise there is little difference from what has been done in the past. The tuned wave traps and tuned inductance method of sectionalizing the line and of coupling the communication circuits thereto, respectively, still remain standard.

The use of tuned wave traps and the tuned inductance method of coupling to the line, both result in rather narrow band tuning, with the result that considerable power escapes beyond the wave traps and can interfere with the next section of the line. It also results in rather poor articulation or low fidelity transmission. As a result, where it has been desired to pass a signal on to the succeeding section of the line, it has been customary, and is, in fact, necessary with this system, to use a new carrier frequency on the next section. Furthermore, since one of the principle necessities in inter-station communication on a power line, for load dispatching and the like, necessitates party-line operation, the method of introducing an intermediate station has been to demodulate the carrier signal and place it on a voice frequency line, to which the local circuit was connected. Repeating or amplification then occurred at voice frequency, the signal was modulated upon the new carrier frequency and imposed on the next section of the line, this resulting in a still further degradation of quality.

It is the broad purpose of this invention to overcome many of the weaknesses of the former systems, among the various objects contributing to this end being the provision of a carrier current system providing high fidelity and using a minimum number of carrier frequencies; to provide a system which is capable of party-line operation; to provide a system having constant loss characteristics on the individual sections, irrespective of switching operations on the power circuits; to provide a system having a minimum of radiation loss from the power line; and hence, and as a result of all of these, to provide a system requiring relatively low transmitter power to give a given distance of transmission.

Considered broadly, the system of my invention involves the use of pairs of conjugate filters to terminate each section of the line, these filters being a band-stop and a band-pass filter, respectively. These filters can be connected to the line through the same type of high voltage condenser which is customary in present practice, where this is necessitated by the voltage of the line. Preferably the single side-band system of carrier communication is used, and it is usual to employ the upper side-band of a single carrier frequency for communication in one direction ("East-West"), while the lower side-band is used for communication in the other direction ("West-East"), but if desired, other methods of modulation can be used.

Connected between the output sides of the two band-pass filters which terminate adjacent sections of the line are two one-way repeaters, one being directed in each direction, and the two repeaters being provided preferably with directional filters for separating the frequencies to be transmitted in the two directions, the filters being used at both input and output of each of the repeaters. Where it is desired to cut a local circuit into the line at a section point, the customary terminal equipment is here provided, coupling the line through a hybrid coil to modulator-demodulator equipment. The demodulators are connected to the directional filters at the input sides of the repeaters, while the modulators are connected to the directional filter at the output sides of the respective repeaters. The hybrid is balanced so as to pass signals from both of the demodulators into the local line, and signals from the local line into both of the modulators, but to block signals passing from the demodulator to the other modulator.

The figure of the drawing is a single-line block diagram, illustrating schematically the organization of the equipment as used in my system.

In the drawing the reference character 1 designates a high tension power line, connecting a terminal station A, an intermediate station B, and a terminal station C. The station B is shown as located at the junction point of a branch line 2, which is symbolic of a switching point or any other connection which would result in an impedance irregularity of the line. The dotted portions of the line represent sections of indeterminate length, connecting between the communication points.

Connected in series with the line, at each end of each section, is a band-stop (band elimination) filter, whose elimination band is broad enough to include all of the frequencies used for signaling on the line. This filter comprises series elements 3, which must have sufficient carrying capacity to transmit the power current carried by the line, and shunt elements including the high tension coupling condensers 4 and other usual circuit elements 5, which carry only the communication currents. Ordinarily the shunt elements of filters are connected line-to-line, which would be phase to phase of a power line. The difficulties of such connections on power lines operating at many kilovolts or hundreds of kilovolts are obvious; therefore, I connect to ground from each phase on which the communication currents are imposed, shunt elements each of one-half the impedance required for the total line-to-line shunt.

It will be noted that the shunt elements of band-pass filters are in general of the series-resonant type, and that the high voltage condensers 4 become integral parts of the series-resonant combination and not merely blocking condensers. Proper design of the other elements of the filter enables the use of smaller capacities in the individual shunt circuits than would be required in a blocking condenser, and hence the costs of the filters can be kept within reason. In general the band-stop filters used will not be of such high quality as those that would be employed in a low tension line, particularly as they can seldom be terminated with exactly the proper impedance. Nevertheless, I have found that without departing from the well-known principles of filter design I can construct filters sufficiently good to make the system fully operative, and that the advantages gained by its use and the economies gained in other portions of the system are sufficient to justify the additional expense that the filters entail.

In designing the band stop filters any of the usual circuits used for such purposes in ordinary telephone practice may be employed, provided that the series elements are heavy enough to carry the power currents. Such inductive series elements are well known, since they have been employed in the wave traps already mentioned as having been used in past practice, as well as in inductors used for coupling communication circuits to power lines. Should a circuit be chosen for this purpose which requires series capacitances in the power line it is obvious that the condensers used must also be of sufficient capacity to carry the power current at the frequencies employed, but although such condensers are known economy will usually dictate that circuit conformations using only inductances as their series elements be used. Band pass filters of this type are shown in every text on filter design.

Adjacent the input or "section" side of each of the band-stop filters is connected a coupling circuit 6, which includes the usual coupling condenser 8 and a band-pass filter 9 which is the conjugate of the band-stop filter; i. e., the band-pass filter will transmit the same wide band of frequencies that the band-stop filter 3 rejects, and will provide, for these frequencies, an impedance which matches the characteristic impedance of the line.

On the output side of the filter 9 the coupling circuit divides into two branches, the branch 11 leading into a high-pass directional filter 14 while the branch 12 leads into a relatively low-pass directional filter 15. It is to be understood that as here used the terms "high-pass" and "low-pass" are relative only, the "high-pass" filter being designed to pass the frequencies of a single communication channel (here assumed to be the side-band used for communication from east to west), while the "low-pass" filter passes the frequencies only of the lower side-band, used in this case for communication from west to east.

At station A a modulator 17 is connected to the input side of the high-pass filter 14, and a demodulator 18 connects into the output side of the low-pass filter 15. This connection is reversed at station B, insofar as it refers to the equipment connected to the same section line of the line that is fed by station A, that is, the modulator 17′ feeds into the low-pass filter 15, while the demodulator 18′ is fed from the high-pass filter 14. The equipment which is connected to the "west-bound" line at station B is connected in exactly the same manner as the equipment at station A, while the equipment at station C is identical in its connections with the equipment at the west end of the section first described.

At each of the stations a local line 20 (or telephone instrument) is connected to both modulator and demodulator through a hybrid coil 21. The hybrid coil is so connected as to pass signals from the line to the modulator and from the demodulator to the line, but to prevent transfer between demodulator and modulator, so that a singing circuit is not set up by the connection of the telephone into the line.

At station B the two modulators and the two demodulators are connected in parallel to the hybrid coil circuit; otherwise, as thus far described, circuits at the ends of each section are identical with the exception of the interchange of the connections between the modulator and demodulator and high-pass and low-pass filters as previously described. Furthermore, at each of the stations additional channels can be connected in at the output of the band-pass filter 9, as is indicated by the reference characters 22. The equipment in this second channel would consist of hybrid, modulator, demodulator and directional filters, as has already been described, the difference being the carrier frequency employed upon this second channel. If the second channel were used it is to be understood that the pass-band of the filter 9 and the stop-band of the filter 3 would each have to be broad enough to include the additional frequencies imposed upon the line by this additional channel.

Additional equipment is provided at station B. This comprises a high frequency repeater 24 connected between the output of the high-pass directional filter 14′ and the input of the high-pass directional filter 14, and a low-pass repeater 25, connected between the output of low-pass filter 15 and the input of low-pass filter 15′. For reasons of both economy and stability, both of these repeaters are one-way repeaters, and therefore another method of describing the connection would be to say that the demodulator is connected in each case to the input side of the repeater, while the modulator is connected to the output side.

It may be desirable to install an intermediate station at a point where no impedance irregularity occurs, although this will not often be the case. If such is desirable, however, it will be evident that a single band-stop filter can be used at the point where the intermediate station is dropped off, this filter operating in both directions to block the incoming signals and to divert them into the repeater and intermediate station. Furthermore, it may be desirable to install a repeater where no intermediate station is needed, and in this case the modulators, demodulators and hybrid coils can be omitted from the system.

As has been implied above, various advantages accrue from the use of the system here described. Not the least of these is the fact that the same carrier frequency can be used on two adjacent sections. This greatly increases the number of channels that can be used, since it is frequently necessary to have two or more intermediate sections where line traps are used between the recurrence of any specific carrier frequency, in order to avoid interference and distortion. Furthermore, where the tuned inductance method of coupling to the line is used, tuning includes a portion at least of the line itself, and the result is that phase differences between the two sides of the line may constitute the line itself into an antenna which may radiate a fairly large portion of the power which is impressed on the line. The present system enables powers to be used for communication which are of the same order as the power used in communication along telephone lines, with a great saving in terminal equipment, in spite of the greater complexity which it appears to involve.

The use of the system here described is not restricted to very high voltage lines; it can be used on lines of moderate voltage, or even on ordinary telephone lines in cases where a necessity arises for sectionalizing the line. This is more likely to occur, however, in the high voltage lines for which the system has been primarily described.

It will be understood that the band-stop and band-pass filters used in my system need not be limited to a single continuous band; filters stopping (or passing, as the case may be) two or more bands of frequencies, to take care of the side-bands of spaced carriers, are equally as applicable as those operating on a single band, and may be more economical. Moreover, where a carrier system of the type here described is installed on a line already carrying a channel of the older type, the operation of the latter may be improved by providing a double band-stop filter, one stop-band of which is substituted for the line trap previously used.

In view of the various uses to which the system can be applied, therefore, I do not wish to be limited to the exact arrangement of apparatus here set forth, but desire to be protected as broadly as is defined in the scope of the following claims.

I claim:

1. A carrier current system for communication over a power line or the like comprising means for sectionalizing said line comprising band-stop filters installed therein at the ends of said sections, coupling circuits connecting into said line at the ends of adjacent sections, each of said coupling circuits having means including a band-pass filter for passing all of the frequencies used for communication on said line, a pair of conjugate directional filters, means for connecting said filters respectively from and into each of said coupling circuits, a pair of one-way repeaters, means connecting said repeaters in series between the similarly directed filters of the respective pairs, a local line, a hybrid coil connected thereto to terminate said line, and a pair of modulators and a pair of demodulators, circuits connecting said modulators and demodulators to said hybrid coil, circuits from said modulators connecting between the outputs of said repeaters and the directional filters, and circuits from said demodulators connected between the other directional filters and the inputs of said repeaters, and said hybrid coil being balanced to pass signals from said demodulators to said local line but not to said modulators, and to pass signals from said local line to both of said modulators.

2. A carrier current system for communication over a power line or the like which includes impedance discontinuities, comprising sectionalizing means including band-stop filters installed in series in said line adjacent each such discontinuity in the portion of said line over which communication is to be conducted, a coupling circuit connecting into each section of said line adjacent said band-stop filters, terminal equipment including modulating-demodulating means for impressing carrier-frequency signals on said line connected to form branch circuits and each of said branch circuits connecting respectively into said coupling circuits, means connecting the branch circuits of adjacent sections for transferring signals therebetween comprising carrier-frequency repeaters, band-pass filters respectively conjugate to said band-stop filters interposed respectively in said coupling circuits between said means connecting the branch circuits of adjacent sections and said band-stop filters, a local line and means for connecting said local line to said modulating-demodulating means of adjacent sections.

3. A system in accordance with claim 2 wherein the modulating means connect respectively to the output sides of said repeaters and the demodulating means connect respectively to the input sides of said repeaters and including directional frequency selective means connected in said branch circuits to select said carrier-frequency signals.

HARRY N. KALB.

REFERENCES CITED

The following references are of record in the file of this patent:

UNITED STATES PATENTS

| Number | Name | Date |
|---|---|---|
| 1,441,270 | Espenchied | Jan. 9, 1923 |
| 1,658,337 | Jammer | Feb. 7, 1928 |
| 1,673,023 | Rettenmeyer | June 12, 1928 |
| 1,705,903 | Davee | Mar. 19, 1929 |
| 1,746,808 | Wolfe | Feb. 11, 1930 |
| 2,038,202 | Weis | Apr. 21, 1936 |
| 2,193,973 | Lomax | Mar. 19, 1940 |
| 2,279,697 | Terroni | Apr. 14, 1942 |
| 2,300,940 | Lenehan | Nov. 3, 1942 |
| 2,336,258 | Kenefake | Dec. 7, 1943 |
| 2,421,333 | Katchatouroff | May 27, 1947 |
| 2,421,727 | Thompson | June 3, 1947 |
| 2,577,731 | Berger | Dec. 11, 1951 |